United States Patent
Ohno et al.

(10) Patent No.: US 11,939,420 B2
(45) Date of Patent: Mar. 26, 2024

(54) EPOXY RESIN CURING AGENT, EPOXY RESIN COMPOSITION, AND USE OF AMINE COMPOSITION

(71) Applicant: MITSUBISHI GAS CHEMICAL COMPANY, INC., Tokyo (JP)

(72) Inventors: Yuma Ohno, Kanagawa (JP); Kazuki Kouno, Kanagawa (JP); Kousuke Ikeuchi, Kanagawa (JP); Emi Ota, Tokyo (JP); Aoi Yokoo, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 18/025,275

(22) PCT Filed: Aug. 19, 2021

(86) PCT No.: PCT/JP2021/030282
§ 371 (c)(1),
(2) Date: Mar. 8, 2023

(87) PCT Pub. No.: WO2022/059411
PCT Pub. Date: Mar. 24, 2022

(65) Prior Publication Data
US 2023/0323017 A1  Oct. 12, 2023

(30) Foreign Application Priority Data
Sep. 15, 2020 (JP) ................. 2020-154773

(51) Int. Cl.
C08G 59/50 (2006.01)
(52) U.S. Cl.
CPC ................ *C08G 59/5026* (2013.01)
(58) Field of Classification Search
None
See application file for complete search history.

(56) References Cited

U.S. PATENT DOCUMENTS

| | | | |
|---|---|---|---|
| 4,070,399 A | 1/1978 | Butte, Jr. | |
| 5,371,293 A | 12/1994 | Takagawa | |
| 2003/0023028 A1 | 1/2003 | Tanaka et al. | |
| 2007/0142572 A1 | 6/2007 | Ogawa et al. | |
| 2012/0238653 A1 | 9/2012 | Horikiri et al. | |
| 2012/0321227 A1 | 12/2012 | Kumamoto et al. | |
| 2018/0079710 A1 | 3/2018 | Kasemi et al. | |

FOREIGN PATENT DOCUMENTS

| | | |
|---|---|---|
| CN | 1432588 A | 7/2003 |
| CN | 102812067 A | 12/2012 |
| CN | 107532055 A | 1/2018 |
| JP | 06-279368 A | 10/1994 |
| JP | 2001-163955 A | 6/2001 |
| JP | 2004-182752 A | 7/2004 |
| JP | 2007-186693 A | 7/2007 |
| JP | 2007-197702 A | 8/2007 |
| JP | 2007-204532 A | 8/2007 |
| JP | 2007-277392 A | 10/2007 |
| JP | 2008-189824 A | 8/2008 |
| JP | 2009-174005 A | 8/2009 |
| JP | 2013-10846 A | 1/2013 |
| JP | 2013-507456 A | 3/2013 |
| JP | 2015-093948 A | 5/2015 |
| JP | 2019-089971 A | 6/2019 |
| SG | 152631 A1 | 6/2009 |
| WO | 2018/110338 A1 | 6/2018 |

OTHER PUBLICATIONS

Insternational Search Report issued in International Bureau of WIPO Patent Application No. PCT/JP2021/030282, dated Sep. 28, 2021, along with an English translation thereof.
Written Opinion issued in International Bureau of WIPO Patent Application No. PCT/JP2021/030282, dated Sep. 28, 2021, along with an English translation thereof.
Wang et al. "Curing of diglycidyl 1,2-cyclohexanedicarboxylate/ modified alicyclic amine system", Thermosetting Resin, vol. 32, No. 2, Mar. 2017 pp. 5-7 (an Abstract and a Concise Statement of relevance (i.e., an English Translation of the Chinese Office Action where this document was cited) are provided).
Barral et al., "Water Absorption of a Diglycidyl Ether of Bisphenol A/1,3-Bisaminomethylcyclohexane (DGEPA/1, 3-BAC) Epoxy Resin System", J. Thermal Anal., vol. 47, 1996, pp. 791-797.

(Continued)

*Primary Examiner* — Megan McCulley
(74) *Attorney, Agent, or Firm* — GREENBLUM & BERNSTEIN, P.L.C.

(57) ABSTRACT

Provided are an epoxy resin curing agent containing an amine composition or a modified product thereof, wherein the amine composition contains bis(aminomethyl)cyclohexane (A) and a compound (B) represented by the following formula (1), and wherein the content of the component (B) based on 100 parts by mass of the component (A) is from 1.5 to 20.0 parts by mass, an epoxy resin composition, and an epoxy resin curing agent for an amine composition. In the formula (1), $R^1$ is an alkyl group having 1 to 6 carbon atoms optionally having a hydroxy group, $R^2NHCH_2$—, where $R^2$ represents an alkyl group having 1 to 6 carbon atoms, or a group represented by the following formula (1A), and p is a number of 0 to 2. In the formula (1A), $R^3$ represents a hydrogen atom or $NH_2$—.

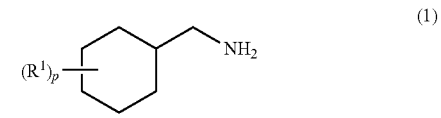

(1)

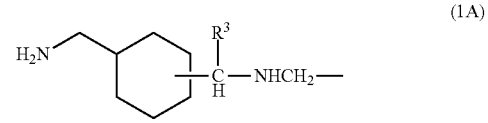

(1A)

7 Claims, No Drawings

(56) References Cited

OTHER PUBLICATIONS

Lopez et al., "Blends of Acrylonitrile-Butadiene-Styrene with an Epoxy/ Cycloaliphatic Amine Resin: Phase-Separation Behavior and Morphologies", J. Appl. Polym. Sci., vol. 85, 2002, pp. 1277-1286.

Gu Xiaohong et al., "Advanced Techniques for Nanocharacterization of Polymeric Coating Surfaces", Journal of Coatings Technology and Research, vol. 1, No. 3, Jul. 2004, pp. 191-200.

EPOXY RESIN CURING AGENT, EPOXY RESIN COMPOSITION, AND USE OF AMINE COMPOSITION

TECHNICAL FIELD

The present invention relates an epoxy resin curing agent, an epoxy resin composition, and use of an amine composition.

BACKGROUND ART

Bis(aminomethyl)cyclohexane is known as a useful compound as a starting material for a polyamide resin and a curing agent for an epoxy resin (PLT 1). PTL 1 discloses a method for producing bis aminomethyl cyclohexane, wherein an aromatic dinitrile is hydrogenated using a catalyst carrying 1 to 10 wt % of ruthenium on a carrier in the presence of 0.5 times by weight or more of ammonia relative to the aromatic dinitrile.

Bis(aminomethyl)cyclohexane as an epoxy resin curing agent is useful because bis(aminomethyl)cyclohexane has low viscosity and has fast curing property among epoxy resin curing agents. For example, PTL 2 discloses an epoxy resin curing agent consisting of a polyamine compound containing bis(aminomethyl)cyclohexane and/or a modified product thereof, a predetermined aliphatic amine compound, and a curing accelerator.

Compounds provided by modifying bis(aminomethyl) cyclohexane are known to be also useful as epoxy resin curing agents. PTL 3 discloses that an epoxy resin composition comprising, as an epoxy resin curing agent, a polyamine compound that is a reaction product of a compound having at least one or more glycidyl groups and a diamine having a specific structure corresponding to bis (aminomethyl)cyclohexane is excellent in the surface appearance such as transparency, ease of drying, adhesion to a substrate, and water resistance.

CITATION LIST

Patent Literature

PTL 1: JP 06-279368 A
PTL 2: JP 2001-163955 A
PTL 3: JP 2007-186693 A

SUMMARY OF INVENTION

Technical Problem

However, when an epoxy resin composition is used in a paint for corrosion resistance, coating films to be provided are required to have good chemical resistance such as acid resistance and salt water corrosion resistance, in addition to water resistance. As for salt water corrosion resistance, it is important that the appearance changes are slight even under exposure to salt water and occurrence of rust on painted surfaces can be suppressed. Conventional arts leave room for improvement in these respects.

An object of the present invention is to provide an epoxy resin curing agent comprising an amine composition containing bis(aminomethyl)cyclohexane or a modified product thereof, the epoxy resin curing agent enabling a coating film excellent in chemical resistance to be formed, an epoxy resin composition comprising the epoxy resin curing agent, and use of an amine composition in an epoxy resin curing agent.

Solution to Problem

The present inventors have found that the above problems can be solved by an epoxy resin curing agent comprising bis(aminomethyl)cyclohexane and an amine composition containing amine compound having a predetermined structure at a predetermined ratio or a modified product thereof.

Accordingly, the present invention relates to the following.

[1] An epoxy resin curing agent comprising an amine composition or a modified product thereof, wherein the amine composition comprises bis(aminomethyl)cyclohexane (A) and a compound (B) represented by the following formula (1), and wherein the content of the component (B) based on 100 parts by mass of the component (A) is from 1.5 to 20.0 parts by mass:

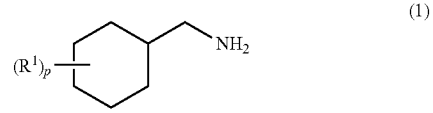

(1)

wherein $R^1$ is an alkyl group having 1 to 6 carbon atoms optionally having a hydroxy group, $R^2NHCH_2-$, where $R^2$ represents an alkyl group having 1 to 6 carbon atoms, or a group represented by the following formula (1A), and p is a number of 0 to 2,

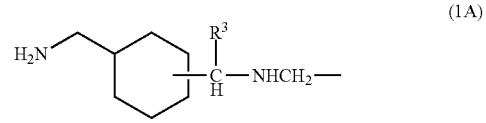

(1A)

wherein $R^3$ represents a hydrogen atom or $NH_2-$.

[2] The epoxy resin curing agent according to the above [1], wherein the component (A) is 1,3-bis(aminomethyl)cyclohexane.

[3] The epoxy resin curing agent according to the above [1] or [2], wherein the component (B) is at least one selected from the group consisting of a compounds (1-1) to (1-6) represented by the following formulas.

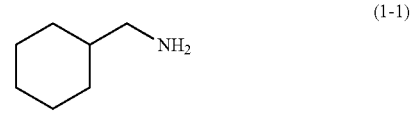

(1-1)

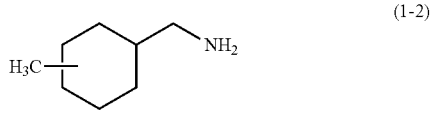

(1-2)

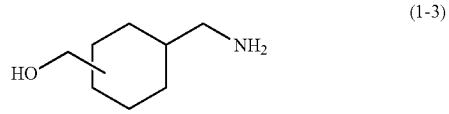

(1-3)

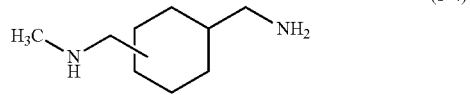

(1-4)

-continued (1-5)

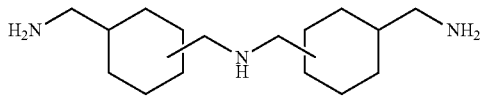

(1-6)

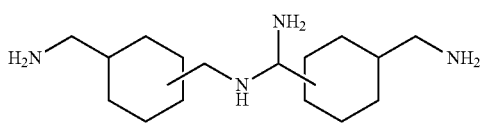

[4] The epoxy resin curing agent according to any one of the above [1] to [3], wherein the total content of the component (A) and the component (B) in the amine composition is 70 mass % or more.

[5] The epoxy resin curing agent according to any one of the above [1] to [4], wherein the modified product of the amine composition is a reaction product of the amine composition and an epoxy group-containing compound.

[6] An epoxy resin composition comprising an epoxy resin and the epoxy resin curing agent according to any one of the above [1] to [5].

[7] Use of an amine composition for an epoxy resin curing agent, wherein the amine composition comprises bis(aminomethyl)cyclohexane (A) and a compound (B) represented by the following formula (1), and wherein the content of the component (B) based on 100 parts by mass of the component (A) is from 1.5 to 20.0 parts by mass:

(1)

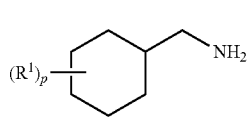

wherein $R^1$ is an alkyl group having 1 to 6 carbon atoms optionally having a hydroxy group, $R^2NHCH_2$—, where $R^2$ represents an alkyl group having 1 to 6 carbon atoms, or a group represented by the following formula (1A), and p is a number of 0 to 2.

(1A)

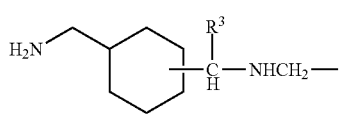

wherein $R^3$ represents a hydrogen atom or $NH_2$—.

Advantageous Effects of Invention

The epoxy resin curing agent of the present invention can provide an epoxy resin composition enabling a coating film excellent in chemical resistance to be formed.

DESCRIPTION OF EMBODIMENTS

[Epoxy Resin Curing Agent]

The epoxy resin curing agent of the present invention comprises amine composition containing bis(aminomethyl) cyclohexane (A) and a compound (B) represented by the following formula (1), the content of the component (B) based on 100 parts by mass of the component (A) is from 1.5 to 20.0 parts by mass, or a modified product thereof.

(1)

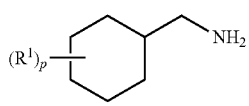

wherein $R^1$ is an alkyl group having 1 to 6 carbon atoms optionally having a hydroxy group, $R^2NHCH_2$—, where $R^2$ represents an alkyl group having 1 to 6 carbon atoms, or a group represented by the following formula (1A), and p is a number of 0 to 2, (1A)

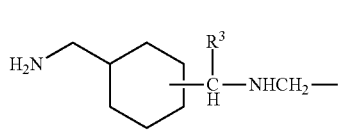

wherein $R^3$ represents a hydrogen atom or $NH_2$—.

The epoxy resin curing agent of the present invention enables to form a coating film having acid resistance and salt water corrosion resistance and excellent in chemical resistance. The reason is not clear, but it is considered that use of an amine composition containing a predetermined amount of the component (B) relative to a component (A) in the epoxy resin curing agent, a component (B) being an amine compound having a cyclohexane ring similar to the component (A) and having a structure different from that of the component (A), improves adhesion of a coating film to be provided of the epoxy resin composition without impairing properties derived from the component (A) to thereby also improve the chemical resistance.

<Bis(aminomethyl)cyclohexane (A)>

The amine composition used in the epoxy resin curing agent of the present invention contains bis(aminomethyl) cyclohexane as the component (A). When the amine composition contains the component (A) as the main component, an epoxy resin curing agent having fast curing and chemical resistance can be provided.

The "main component" referred to herein means an amine component having the highest content in the amine composition and more specifically means an amine component having a content in the amine composition of preferably 50 mass % or more, more preferably 60 mass % or more, and further preferably 70 mass % or more.

Examples of bis(aminomethyl)cyclohexane include 1,2-bis(aminomethyl)cyclohexane, 1,3-bis(aminomethyl)cyclohexane, and 1,4-bis(aminomethyl)cyclohexane, and these can be used singly or in combinations of two or more thereof. From the viewpoint of curability and handling property, 1,3-bis(aminomethyl)cyclohexane is preferred.

Both a cis isomer and a trans isomer are included in bis(aminomethyl)cyclohexane. The content ratio of the cis isomer to the trans isomer is optional, but when both the cis isomer and the trans isomer are included, bis(aminomethyl) cyclohexane can be handled as a liquid due to freezing point depression even under a low temperature environment during winter or the like. Thus, the content ratio of the cis isomer/trans isomer is preferably from 99/1 to 1/99, more preferably from 95/5 to 30/70, further preferably from 90/10 to 50/50, and still further preferably from 85/15 to 60/40.

<Compound (B)>

The component (B) for use in the present invention is a compound represented by the following formula (1). Use of the component (B) can provide an epoxy resin composition that enables a coating film excellent in chemical resistance to be formed when the epoxy resin curing agent of the present invention is used.

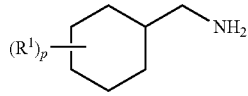
(1)

wherein $R^1$ is an alkyl group having 1 to 6 carbon atoms optionally having a hydroxy group, $R^2NHCH_2$—, where $R^2$ represents an alkyl group having 1 to 6 carbon atoms, or a group represented by the following formula (1A), and p is a number of 0 to 2.

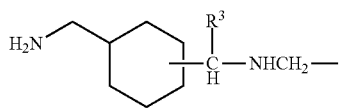
(1A)

wherein $R^3$ represents a hydrogen atom or $NH_2$—.

In the formula (1), examples of the alkyl group having 1 to 6 carbon atoms optionally having a hydroxy group in $R^1$ can include linear or branched chain alkyl groups having 1 to 6 carbon atoms or groups provided by substituting one or more hydrogen atoms in the alkyl groups with a hydroxy group. When $R^1$ is an alkyl group having a hydroxy group, the number of the hydroxy group is preferably from 1 to 3, more preferably from 1 to 2, and further preferably 1.

Specific examples thereof include a methyl group, an ethyl group, various propyl groups, various butyl groups, various pentyl groups, various hexyl groups, a hydroxymethyl group, a hydroxyethyl group, a hydroxypropyl group, a hydroxybutyl group, a hydroxypentyl group, and a hydroxyhexyl group. Of these, alkyl groups having 1 to 4 carbon atoms optionally having a hydroxy group are preferred, alkyl groups having 1 to 3 carbon atoms optionally having a hydroxy group are more preferred, a methyl group, an ethyl group, or a hydroxymethyl group is further preferred, and a methyl group is still further preferred.

$R^2$ in $R^2NHCH_2$— is an alkyl group having 1 to 6 carbon atoms, and examples thereof can include linear or branched chain alkyl groups having 1 to 6 carbon atoms. Specific examples thereof include a methyl group, an ethyl group, various propyl groups, various butyl groups, various pentyl groups, and various hexyl groups. Of these, alkyl groups having 1 to 4 carbon atoms are preferred, alkyl groups having 1 to 3 carbon atoms are more preferred, a methyl group and an ethyl group are further preferred, and a methyl group is still further preferred.

In the group represented by the formula (1A), $R^3$ is a hydrogen atom or $NH_2$— and preferably a hydrogen atom.

In the formula (1), p is a number of 0 to 2 and preferably 0 to 1.

From the viewpoint of forming a coating film excellent in chemical resistance when the epoxy resin curing agent of the present invention is used, the component (B) is preferably at least one selected from the group consisting of compounds (1-1) to (1-6) represented by the following formulas, and more preferably includes at least one selected from the group consisting of the compounds (1-1), (1-2), and (1-5) represented by the following formulas.

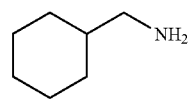
(1-1)

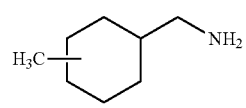
(1-2)

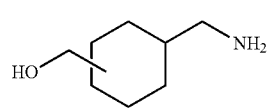
(1-3)

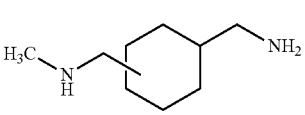
(1-4)

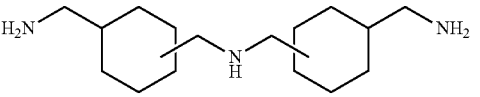
(1-5)

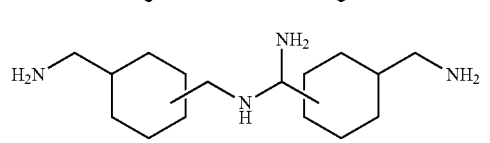
(1-6)

The compound (1-1) is cyclohexylmethylamine. Examples of the compound (1-2) include 2-methyl-1-aminomethylcyclohexane, 3-methyl-1-aminomethylcyclohexane, and 4-methyl-1-aminomethylcyclohexane, and these can be used singly or in combinations of two or more thereto.

The total amount of the compounds (1-1), (1-2), and (1-5) in the component (B) is preferably 30 mass % or more, more preferably 40 mass % or more, and further preferably 45 mass % or more from the viewpoint of forming a coating film excellent in chemical resistance. The upper limit thereof is 100 mass %.

The content of the component (B) in the amine composition for use in the epoxy resin curing agent of the present invention is, based on 100 parts by mass of the component (A), 1.5 parts by mass or more, preferably 2.0 parts by mass or more, and more preferably 2.5 parts by mass or more from the viewpoint of forming a coating film excellent in chemical resistance, and 20.0 parts by mass or less, preferably 18.0 parts by mass or less, and more preferably 15.0 parts by mass or less from the viewpoint of forming a coating film excellent in chemical resistance and from the viewpoint of maintaining fast curing derived from the component (A).

The total content of the component (A) and the component (B) in the amine composition for use in the epoxy resin curing agent of the present invention is preferably 70 mass % or more, more preferably 80 mass % or more, further preferably 90 mass % or more, and still further preferably 95 mass % or more from the viewpoint of making the component (A) the main component and from the viewpoint of achieving the effects of the present invention. The upper limit thereof is 100 mass %.

A method for producing an amine composition for use in the epoxy resin curing agent of the present invention is not particularly limited, and the amine composition can be produced by formulating and mixing the component (A) and the component (B) each in a predetermined amount. If it is possible to adjust a catalyst to be used and production conditions in production of the component (A) and conduct a reaction for generating the component (B) at a predetermined ratio in parallel with the production of the component (A), a method using this is also exemplified. In this case, the contents of the component (A) and the component (B) in the amine composition can be determined by gas chromatography analysis or the like.

The epoxy resin curing agent of the present invention may include a modified product of the amine composition. From the viewpoint of forming a coating film excellent in chemical resistance and from the viewpoint of improving the physical properties of coating film such as hardness, the curing agent of the present invention preferably contains a modified product of the amine composition.

Examples of the modified product of the amine composition include reaction products provided by reacting the amine composition, an epoxy group-containing compound, an unsaturated hydrocarbon compound, a carboxylic acid or a derivative thereof, and the like; and Mannich reaction products provided by reacting the amine composition, a phenol compound, and an aldehyde compound. Of these, from the viewpoint of forming a coating film excellent in chemical resistance and from a viewpoint of cost efficiency, reaction products of an amine composition and an epoxy group-containing compound are preferred.

The epoxy group-containing compound may have at least one epoxy group and a compound having 2 or more epoxy groups is more preferred.

Specific examples of the epoxy group-containing compound include epichlorohydrin, butyl diglycidyl ether, neopentyl glycol diglycidyl ether, 1,3-propanediol diglycidyl ether, 1,4-butanediol diglycidyl ether, 1,6-hexanediol diglycidyl ether, biphenol diglycidyl ether, dihydroxynaphthalene diglycidyl ether, dihydroxyanthracene diglycidyl ether, triglycidyl isocyanurate, tetraglycidyl glycoluril, polyfunctional epoxy resins having a glycidylamino group derived from m-xylylenediamine, polyfunctional epoxy resins having a glycidylamino group derived from 1,3-bis(aminomethyl)cyclohexane, polyfunctional epoxy resins having a glycidylamino group derived from diaminodiphenylmethane, polyfunctional epoxy resins having a glycidylamino group derived from p-aminophenol, polyfunctional epoxy resins having a glycidyloxy group derived from p-aminophenol, polyfunctional epoxy resins having a glycidyloxy group derived from bisphenol A, polyfunctional epoxy resins having a glycidyloxy group derived from bisphenol F, polyfunctional epoxy resins having a glycidyloxy group derived from phenol novolac, and polyfunctional epoxy resins having 2 or more glycidyloxy groups derived from resorcinol. These can be used singly or in combinations of two or more thereof.

The epoxy group-containing compound is more preferably a compound including an aromatic ring or an alicyclic structure in the molecule, further preferably a compound including an aromatic ring in the molecule, and still further preferably a polyfunctional epoxy resin having a glycidyloxy group derived from bisphenol A from the viewpoint of forming a coating film excellent in chemical resistance and from the viewpoint of curing.

A reaction product is provided by ring-opening addition reacting an amine composition and an epoxy group-containing compound in a known manner. In an exemplary method, a reactor is charged with the amine composition, the epoxy group-containing compound is added batchwise or added in portions by dropwise addition or the like thereto and subjected to a reaction by heating. The addition reaction is preferably conducted under an inert atmosphere such as nitrogen gas.

The amount of the amine composition and epoxy group-containing compound to be used is not particularly limited as long as a ratio is achieved at which a modified product to be provided contains an amino group having active hydrogen. In the addition reaction, an excess of the amine composition is preferably used relative to the epoxy equivalent of the epoxy group-containing compound from the viewpoint that a modified product to be provided exhibits a function as an epoxy resin curing agent. Specifically, the amine composition and epoxy group-containing compound are used so as to achieve preferably [D]/[G]=50/1 to 4/1 and more preferably [D]/[G]=20/1 to 8/1, wherein [D] represents the number of active hydrogen atoms in the amine composition, and [G] represents the number of epoxy groups of the epoxy group-containing compound.

The temperature and reaction time during the addition reaction can be appropriately selected. From the viewpoint of the reaction rate, productivity, prevention of decomposition of the starting material, and the like, the temperature during the addition reaction is preferably from 50 to 150° C. and more preferably from 70 to 120° C. The reaction time is preferably from 0.5 to 12 hours and more preferably from 1 to 6 hours after addition of the epoxy group-containing compound is completed.

The epoxy resin curing agent of the present invention may be a curing agent consisting of the amine composition or a modified product thereof and may also contain a curing agent component other than the amine composition or a modified product thereof. Examples of other curing agent components include polyamine compounds or modified products thereof other than the component (A), component (B) or a modified product thereof.

To the curing agent of the present invention, a known non-reactive diluent and the like may be blended as long as the effects of the present invention are not impaired.

The content of the amine composition or a modified product thereof in the curing agent of the present invention is, however, preferably 50 mass % or more, more preferably 70 mass % or more, further preferably 80 mass % or more, still further preferably 90 mass % or more relative to the entire curing agent components in the curing agent from the viewpoint of achieving the effects of the present invention. The upper limit thereof is 100 mass %.

The method of preparing the epoxy resin curing agent of the present invention is not particularly limited and may be appropriately selected depending on the form of use, the apparatus to be used, and the type and ratio of the components to be blended. For example, the epoxy resin curing agent can be prepared by formulating and mixing the amine composition or a modified product, and other curing agent components and a non-reactive diluent, which are used as required.

[Epoxy Resin Composition]

The epoxy resin composition of the present invention comprises an epoxy resin and the epoxy resin curing agent. The epoxy resin composition of the present invention enables a coating film having acid resistance, salt water corrosion resistance, and the like to be provided.

The epoxy resin as the main agent of the epoxy resin composition may be any of saturated or unsaturated aliphatic compounds or alicyclic compounds, aromatic compounds, and heterocyclic compounds. From the viewpoint of providing a coating film excellent in chemical resistance, an epoxy resin including an aromatic ring or an alicyclic structure in the molecule is preferred.

Specific examples of the epoxy resin include at least one resin selected from the group consisting of epoxy resins having a glycidylamino group derived from m-xylylenediamine, epoxy resins having a glycidylamino group derived from p-xylylenediamine, epoxy resins having a glycidylamino group derived from 1,3-bis(aminomethyl)cyclohexane, epoxy resins having a glycidylamino group derived from 1,4-bis(aminomethyl)cyclohexane, epoxy resins having a glycidylamino group derived from diaminodiphenylmethane, epoxy resins having a glycidylamino group and/or a glycidyloxy group derived from p-aminophenol, epoxy resins having a glycidyloxy group derived from bisphenol A, epoxy resins having a glycidyloxy group derived from bisphenol F, epoxy resins having a glycidyloxy group derived from phenol novolac, and epoxy resin having a glycidyloxy group derived from resorcinol. The epoxy resins described above may be used in mixture of two or more thereof.

Of those described above, from the viewpoint of providing a coating film excellent in chemical resistance, as the epoxy resin, ones including, as the main component, at least one selected from the group consisting of epoxy resins having a glycidylamino group derived from m-xylylenediamine, epoxy resins having a glycidylamino group derived from p-xylylenediamine, epoxy resins having a glycidyloxy group derived from bisphenol A, and epoxy resins having a glycidyloxy group derived from bisphenol F are preferred. From the viewpoint of providing a coating film excellent in chemical resistance and from the viewpoint of availability and cost efficiency, ones including, as the main component, an epoxy resin having a glycidyloxy group derived from bisphenol A are more preferred.

The "main component" referred to herein means that other components may be included without departing from the gist of the present invention, meaning preferably from 50 to 100 mass %, more preferably from 70 to 100 mass %, and further preferably from 90 to 100 mass % of the total.

The content of the epoxy resin curing agent in the epoxy resin composition of the present invention is an amount at which the ratio of the number of active hydrogen atoms in the epoxy resin curing agent to the number of epoxy groups in the epoxy resin (number of active hydrogen atoms in epoxy resin curing agent/number of epoxy groups in epoxy resin) is preferably from 1/0.5 to 1/2, more preferably from 1/0.75 to 1/1.5, and further preferably from 1/0.8 to 1/1.2.

The epoxy resin composition of the present invention may also comprise a modifying component such as a filler and a plasticizer, a component for adjusting flowability such as a thixotropic agent, and other components such as a pigment, a leveling agent, a tackifier and elastomer fine particles depending on the use.

However, the total content of the epoxy resin and the epoxy resin curing agent in the epoxy resin composition is preferably 50 mass % or more, more preferably 70 mass % or more, further preferably 80 mass % or more, and still further preferably 90 mass % or more from the viewpoint of achieving the effects of the present invention. The upper limit thereof is 100 mass %.

The method for preparing the epoxy resin composition of the present invention is not particularly limited, and the composition may be produced by mixing the epoxy resin, the epoxy resin curing agent, and other components as required by a known method using a known apparatus. The order of mixing the components to be contained in the epoxy resin composition is not particularly limited. The epoxy resin curing agent may be prepared and then mixed with an epoxy resin. Preparation may be conducted by simultaneously mixing the components constituting the epoxy resin curing agent and the epoxy resin.

Curing the epoxy resin composition of the present invention by a known method can provide an epoxy resin cured product. Conditions for curing the epoxy resin composition are appropriately selected depending on applications and forms.

<Applications>

The epoxy resin composition of the present invention, which is characterized in that a coating film excellent in chemical resistance can be provided therefrom, is suitably used for various paints such as paints for corrosion resistance, adhesives, flooring, sealants, polymer cement mortar, gas barrier coating, primer, screed, topcoat, sealing material, crack repairing material, concrete material, and the like. Paints for corrosion resistance are used for painting marine vessels, bridges, buildings such as plants, and other subaerial and offshore iron structures, for example.

[Use]

The present invention also provides use of an amine composition for an epoxy resin curing agent, the amine composition comprising bis(aminomethyl)cyclohexane (A) and a compound (B) represented by the following formula (1), the content of the component (B) based on 100 parts by mass of the component (A) is from 1.5 to 20.0 parts by mass.

$$(R^1)_p \!-\!\!\!\bigcirc\!\!\!-\!\!\text{CH}_2\text{NH}_2 \quad (1)$$

wherein $R^1$ is an alkyl group having 1 to 6 carbon atoms optionally having a hydroxy group, $R^2\text{NHCH}_2$—, where $R^2$ represents an alkyl group having 1 to 6 carbon atoms, or a group represented by the following formula (1A), and p is a number of 0 to 2.

$$H_2N\text{CH}_2\!-\!\!\!\bigcirc\!\!\!-\!\!\underset{H}{\overset{R^3}{\text{C}}}\!-\!\text{NHCH}_2\!- \quad (1A)$$

wherein $R^3$ represents a hydrogen atom or $NH_2$—.

In the present invention, "use of an amine composition for an epoxy resin curing agent" encompasses both use of an amine composition as it is as a curing agent, and use of a modified product provided by modifying the amine component in an amine composition as a curing agent.

The amine composition and a preferred form thereof are the same as described above.

EXAMPLES

Hereinafter, the present invention will be described in more detail with reference to Examples and Comparative Examples, but the present invention is not limited to the following Examples. Evaluations on epoxy resin curing agents, epoxy resin compositions, and cured products thereof were carried out in the following manners.

<Chemical Resistance>

A zinc phosphate-treated iron plate (manufactured by PALTECH Co., Ltd.; SPCC-SD PB-N144 0.8×70×150 mm) was used as a base material. An epoxy resin composition of each example was applied using an applicator onto the base material to form a coating film (thickness immediately after application: 200 μm). After storage under conditions of 23° C. and 50% R.H. for 7 days, the unpainted portion was sealed with rust preventive paints ("Million Primer" and "Million Clear" manufactured by Kansai Paint Co., Ltd.) to produce a specimen. This specimen was stored under conditions of 23° C. and 50% R.H., and the specimen after 7 days passed was subjected to chemical resistance evaluated by the following method.

(Sulfuric Acid Aqueous Solution)

The specimen was immersed in a 10% sulfuric acid aqueous solution under a 23° C. condition. After 4 weeks passed, the appearance was visually observed to check the presence/absence of swelling of the coating film.

(5% Salt Water Spray)

A crosscut specimen was produced having two diagonally-intersecting incisions of 50 mm in length cut using a cutter knife, in accordance with JIS K5600-7-9:2006, on the coating film surface of the specimen.

The crosscut specimen was placed in a salt water spray tester ("STP-90" manufactured by Suga Test Instruments Co., Ltd., in-bath temperature: 35° C.). Salt water (concentration: 5 mass %) was continuously sprayed, and after 4 weeks passed, the appearance was visually observed to check the presence/absence of peeling of the coating film. The rust width (mm) on the base material occurring at the crosscut site was also checked. A smaller rust width indicates more excellent corrosion resistance.

Example 1 (Preparation and Evaluation of Amine Composition, Epoxy Resin Curing Agent, and Epoxy Resin Composition)

[Preparation of Amine Composition]

5.3 parts by mass of a compound (1-5-1) represented by the following formula as the component (B) were added to 100 parts by mass of 1,3-bis(aminomethyl)cyclohexane (1,3-BAC, manufactured by Mitsubishi Gas Chemical Company, Inc., cis/trans ratio=77/23) as the component (A) and mixed to prepare an amine composition.

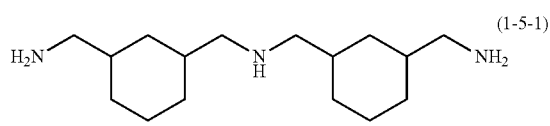

(1-5-1)

[Preparation of Epoxy Resin Curing Agent]

97.2 g of the above amine composition was loaded in a separable flask having an inner volume of 300 milliliters and equipped with a stirrer, a thermometer, a nitrogen inlet tube, a dropping funnel, and a condenser, and the temperature was raised to 80° C. with stirring under a nitrogen stream. With the temperature kept at 80° C., 50.0 g (an amount at which number of active hydrogen atoms in amine composition/number of epoxy groups in epoxy group-containing compound=10/1 is achieved) of a polyfunctional epoxy resin having glycidyloxy groups derived from bisphenol A ("jER828" manufactured by Mitsubishi Chemical Corporation, bisphenol A diglycidyl ether, epoxy equivalent: 186 g/equivalent) as an epoxy group-containing compound was added dropwise over 2 hours. After the dropwise addition was completed, the temperature was raised to 100° C., a reaction was conducted for 2 hours, and a reaction product of the amine composition and jER828 was provided. Benzyl alcohol, an unreactive diluent, was added thereto for dilution in an amount of 40 mass % relative to the total amount, and an epoxy resin curing agent in which the concentration of the reaction product was 60 mass % was provided.

[Preparation of Epoxy Resin Composition]

As the epoxy resin as the main agent of the epoxy resin composition, an epoxy resin having glycidyloxy groups derived from bisphenol A ("jER828" manufactured by Mitsubishi Chemical Corporation, bisphenol A diglycidyl ether, epoxy equivalent: 186 g/equivalent) was used. The epoxy resin and the epoxy resin curing agent were blended and mixed such that the ratio of the number of active hydrogen atoms in the epoxy resin curing agent to the number of epoxy groups in the epoxy resin as the main agent (number of active hydrogen atoms in the epoxy resin curing agent/number of epoxy groups in the epoxy resin) reached 1/1 to prepare an epoxy resin composition.

The resulting epoxy resin composition was used to conduct chemical resistance evaluation. The results are shown in Table 1.

Examples 2 to 7 and Comparative Examples 1 to 3

An amine composition was prepared by formulating components each in parts by mass shown in Table 1. This amine composition and a polyfunctional epoxy resin having glycidyloxy groups derived from bisphenol A ("jER828" manufactured by Mitsubishi Chemical Corporation, bisphenol A diglycidyl ether, epoxy equivalent: 186 g/equivalent) were used each in the amount shown in Table 1 to provide an epoxy resin curing agent in the same manner as in Example 1. Further, the epoxy resin curing agent was used to prepare an epoxy resin composition and conduct chemical resistance evaluation in the same manner as in Example 1. The results are shown in Table 1.

TABLE 1

| | | | | | | Example | | | | | | | Comparative Example | | |
|---|---|---|---|---|---|---|---|---|---|---|---|---|---|---|---|
| | | | | | | 1 | 2 | 3 | 4 | 5 | 6 | 7 | 1 | 2 | 3 |
| Epoxy resin composition | Curing agent (reaction product) | Amine composition | (A) | 1,3-BAC | Parts by mass | 100 | 100 | 100 | 100 | 100 | 100 | 100 | 100 | 100 | 100 |
| | | | (B) | 3-MAMC | Parts by mass | | 2.5 | 2.5 | 2.5 | 2.5 | 2.5 | | | | 2.5 |
| | | | | CMA | Parts by mass | | | | | | 5.4 | 11.4 | | | |

TABLE 1-continued

| | | | | | | | | | | | | |
|---|---|---|---|---|---|---|---|---|---|---|---|---|
| | | Compound (1-5-1) | Parts by mass | 5.3 | 5.4 | 11.4 | 16.1 | | | 1.9 | | 25.0 | 25.7 |
| | | Component (B) total | Parts by mass *1 | 5.3 | 7.9 | 13.9 | 18.6 | 7.9 | 13.9 | 1.9 | 0.0 | 25.0 | 28.2 |
| | | Component (A) content | Mass % | 95.0 | 92.7 | 87.8 | 84.3 | 92.7 | 87.8 | 98.1 | 100.0 | 80.0 | 78.0 |
| | | Amount of amine composition added | g | 97.2 | 99.0 | 100.2 | 101.0 | 99.2 | 100.4 | 97.5 | 97.1 | 101.6 | 102.5 |
| | | Amount of epoxy group-containing compound added | g | 50.0 | 50.0 | 50.0 | 50.0 | 50.0 | 50.0 | 50.0 | 50.0 | 50.0 | 50.0 |
| | | Number of active hydrogen atoms in amine composition/number of epoxy groups in epoxy group-containing compound | | 10/1 | 10/1 | 10/1 | 10/1 | 10/1 | 10/1 | 10/1 | 10/1 | 10/1 | 10/1 |
| | | Number of active hydrogen atoms in curing agent/number of epoxy groups in main agent epoxy resin | | 1/1 | 1/1 | 1/1 | 1/1 | 1/1 | 1/1 | 1/1 | 1/1 | 1/1 | 1/1 |
| Chemical resistance | Sulfuric acid aqueous solution | Presence/absence of swelling of coating film (after 4 weeks) | | Absent | Absent | Absent | Absent | Absent | Absent | Absent | Absent | Absent | Absent |
| | 5% Salt water spray | Crosscut test of coating film-presence/absence of peeling (after 4 weeks) | | Absent | Absent | Absent | Absent | Absent | Absent | Absent | Present | Present | Present |
| | | Crosscut test of coating film-rust width in crosscut site(mm)*2 | | 1.5 | 1.5 | 1.5 | 1.5 | 1.5 | 1.5 | 1.5 | 2 | 2 | 1.5 |

*1 Parts by mass based on 100 parts by mass of the component (A)
*2 In a specimen in which peeling was "present", a portion having no peeling was observed.

Abbreviations in the Table 1 are as follows.
1,3-BAC: 1,3-bis(aminomethyl)cyclohexane
3-MAMC: 3-methyl-1-aminomethylcyclohexane
CMA: cyclohexylmethylamine It can be seen from Table 1 that the epoxy resin compositions comprising the epoxy resin curing agent of the present invention is more excellent in chemical resistance than the epoxy resin composition of Comparative Examples 1 to 3.

INDUSTRIAL APPLICABILITY

The epoxy resin curing agent of the present invention can provide an epoxy resin composition enabling a coating film excellent in chemical resistance to be formed.

The invention claimed is:

1. An epoxy resin curing agent comprising an amine composition or a modified product thereof,
wherein the amine composition comprises bis(aminomethyl)cyclohexane (A) and a compound (B) represented by the following formula (1), and
wherein the content of the component (B) based on 100 parts by mass of the component (A) is from 1.5 to 20.0 parts by mass:

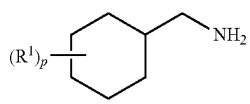

(1)

wherein $R^1$ is an alkyl group having 1 to 6 carbon atoms optionally having a hydroxy group, $R^2NHCH_2$—, where $R^2$ represents an alkyl group having 1 to 6 carbon atoms, or a group represented by the following formula (1A), and p is a number of 0 to 2,

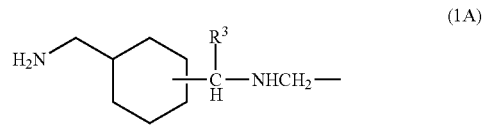

(1A)

wherein $R^3$ represents a hydrogen atom or $NH_2$—.

2. The epoxy resin curing agent according to claim 1, wherein the component (A) is 1,3-bis(aminomethyl)cyclohexane.

3. The epoxy resin curing agent according to claim 1, wherein the component (B) is at least one selected from the group consisting of a compounds (1-1) to (1-6) represented by the following formulas:

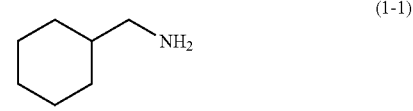

(1-1)

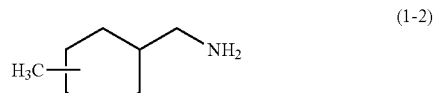

(1-2)

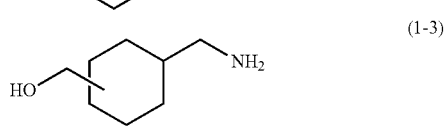

(1-3)

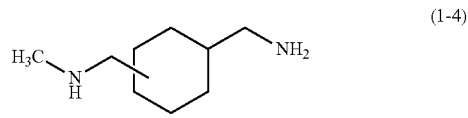

(1-4)

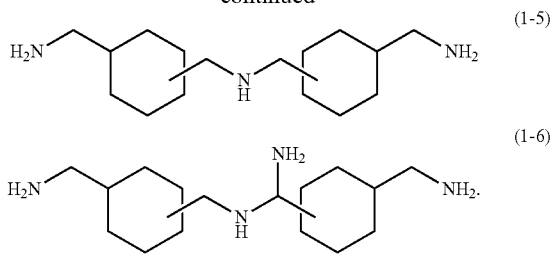

4. The epoxy resin curing agent according to claim 1, wherein the total content of the component (A) and the component (B) in the amine composition is 70 mass % or more.

5. The epoxy resin curing agent according to claim 1, wherein the modified product of the amine composition is a reaction product of the amine composition and an epoxy group-containing compound.

6. An epoxy resin composition comprising an epoxy resin and the epoxy resin curing agent according to claim 1.

7. A method comprising:
preparing an epoxy resin composition by mixing an epoxy resin and an epoxy resin curing agent comprising an amine composition or a modified product thereof, and
curing the epoxy resin composition to form an epoxy resin cured product;
wherein the amine composition comprises bis(aminomethyl)cyclohexane (A) and a compound (B) represented by the following formula (1):

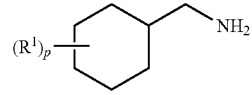

wherein
p is a number of 0 to 2, and
$R^1$ is
an alkyl group having 1 to 6 carbon atoms optionally having a hydroxy group,
$R^2NHCH_2-$, where $R^2$ represents an alkyl group having 1 to 6 carbon atoms, or
a group represented by the following formula (1A)

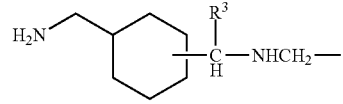

wherein $R^3$ represents a hydrogen atom or $NH_2$; and
wherein the content of the component (B) based on 100 parts by mass of the component (A) is from 1.5 to 20.0 parts by mass.

* * * * *